Oct. 28, 1952 L. J. HUGHES 2,615,728
TANDEM AXLE FOR TRAILERS
Filed Nov. 2, 1951 2 SHEETS—SHEET 1

INVENTOR.
LUTHER J. HUGHES
BY
William J. Ruano
ATTORNEY

Oct. 28, 1952     L. J. HUGHES     2,615,728
TANDEM AXLE FOR TRAILERS

Filed Nov. 2, 1951     2 SHEETS—SHEET 2

INVENTOR.
LUTHER J. HUGHES
BY William J. Ruano
ATTORNEY

Patented Oct. 28, 1952

2,615,728

UNITED STATES PATENT OFFICE 2,615,728

TANDEM AXLE FOR TRAILERS

Luther J. Hughes, Reading, Pa.

Application November 2, 1951, Serial No. 254,576

3 Claims. (Cl. 280—104.5)

The present invention relates to a tandem axle construction for a trailer, more particularly, a heavy duty, low bed trailer which is drawn by a tractor or truck and having sets of rear wheels arranged in tandem in a manner so as to rock about transverse axes, the wheels of each set being rotatable about longitudinal axes, thereby permitting the wheels to move up and down in longitudinal and transverse planes to compensate for road irregularities.

Common types of tandem axle constructions for heavy duty trailers usually comprise separately mounted walking beams not tied together by any appreciable cross bracing, therefore have a tendency to get out of alignment. Also, they lack the necessary rigidity and strength for extremely heavy duty trailers as well as freedom of movement to insure riding of all wheels on an irregular roadway at all times.

An object of the present invention is to provide a novel tandem axle construction which is particularly useful for low bed, heavy duty trailers, of the order of thirty tons or more load carrying capacity, which axle construction is relatively sturdy and incorporates cross bracing to maintain alignment of all parts and to impart considerable strength and load carrying capacity to the assembly as well as to insure riding of all the wheels on an irregular roadway at all times.

A more specific object of my invention is to provide a novel tandem axle construction for heavy duty trailers which includes walking beams pivotally mounted on transverse axes and having wheels swivelly mounted on the ends thereof for rotation about longitudinal axes to permit movement of the wheels so as to follow road irregularities, which construction is well known, but including, in addition, cross bracing elements for imparting rigidity to the walking beams with substantially universal movement of the wheel mountings to enable the lowermost tilted wheels to ride on depressions in the roadway at all times.

Other objects and advantages of the present invention will be apparent from a study of the following description, taken with the accompanying drawings wherein.

Figure 1:
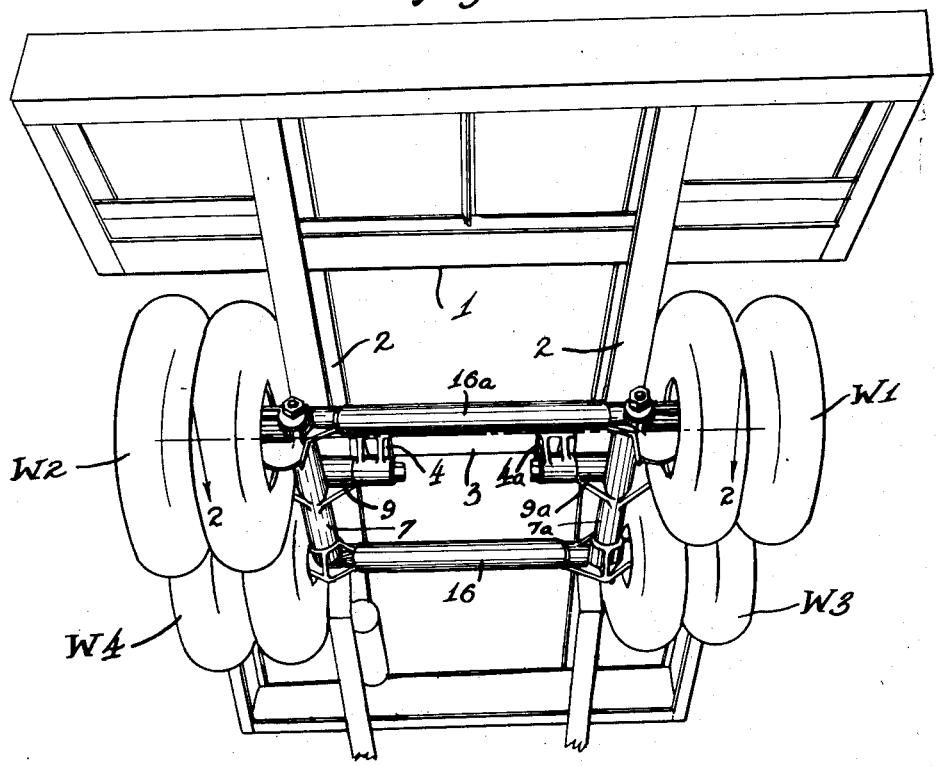
Figure 1 is a bottom perspective view of a low bed trailer having a tandem axle construction embodying the principles of my invention.
Figure 2:
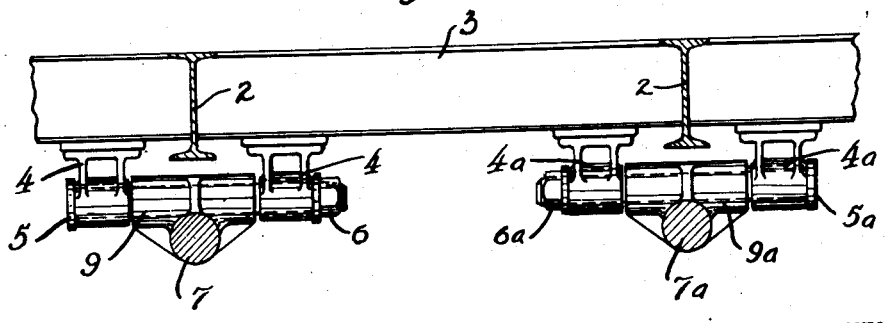
Figure 2 is an enlarged, transverse cross sectional view taken along line 2—2 of Figure 1.
Figure 3:
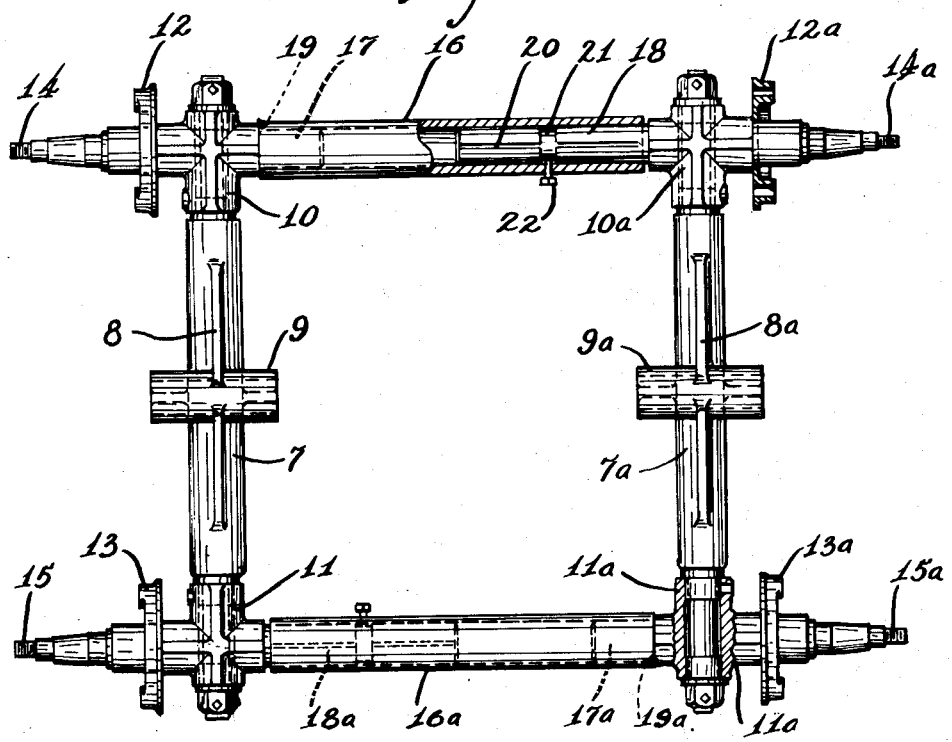
Figure 3 is a top plan view of the tandem axle construction shown in Figures 1 and 2 and more clearly illustrating the novel features of my tandem axle construction.

Referring more particularly to Figures 1 and 2, numeral 1 denotes the frame of a low bed trailer adapted to be drawn by a tractor (not shown) and having longitudinal frame members 2 interconnected by a plurality of transversely extending frame members, such as 3. As shown more clearly in Figure 2, rigidly fastened underneath one of the transverse frame members 3 are two pairs of brackets 4, 4 and 4a, 4a which are adapted to support bearing members or pins having flattened heads 5 and 5a and long shank portions extending through the pairs of supporting brackets and having threaded ends on which are screw threadedly mounted bolts 6 and 6a, respectively. These bearing pins extend through transverse bores of walking beams 7 and 7a, respectively, for pivotal movement of the beams about transverse axes. The walking beams 7 and 7a are provided with longitudinally extending ribs 8 and 8a and with boss portions 9 and 9a, respectively.

On the ends of the walking beams 7 and 7a, there are provided spindle portions on which are swivelly mounted housing members 10, 11 and 10a, 11a, respectively, to which are secured wheel hubs 12, 13 and 12a, 13a, respectively, as well as the wheel spindles 14, 15 and 14a, 15a, respectively. Housing members 10 and 10a are interconnected by means of a sleeve 16 telescopically fitted about a stub portion 17 of housing member 10 to which the sleeve 16 is shrunk fit and welded about perimeter 19, and by a stub portion 18 of housing member 10a which is freely slidable in a longitudinal direction with respect to sleeve 16. Similarly, a sleeve 16a is rigidly secured by a shrink fit to stub portion 17a of the housing member 11a, and by welding about the joint 19a, and is freely slidable with respect to and telescopically fitted onto stub portion 18a of housing member 11. Thus sleeves 16 and 16a act essentially as axles for dual wheels W1, W2, W3 and W4 which are mounted on each of the spindles 15a, 15, 14a and 14, respectively, as shown more clearly in Figure 1. On the stub portions, such as 18, are provided a plurality of V grooves 20 and a grease relief groove 21. A nipple 22 is disposed opposite the latter for introducing grease to the longitudinally slidable parts 18 and 16.

Figure 4:
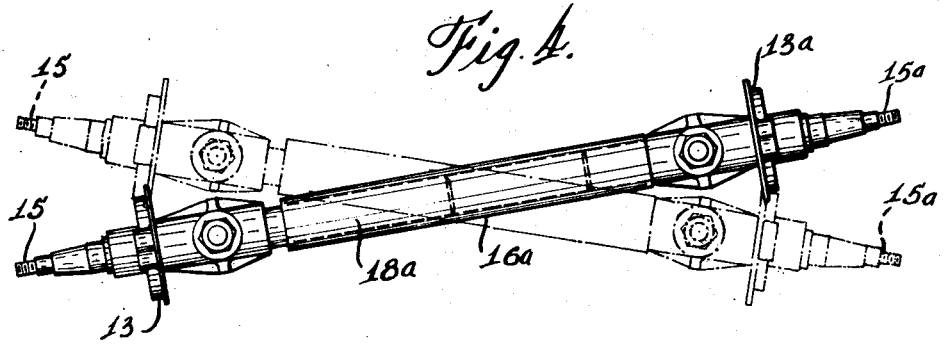
Figure 4 is a rear elevational view of the tandem axle construction shown in Figure 3 illustrating only the rear axle pivotally moved in vertical planes in opposite directions.
Figure 5:
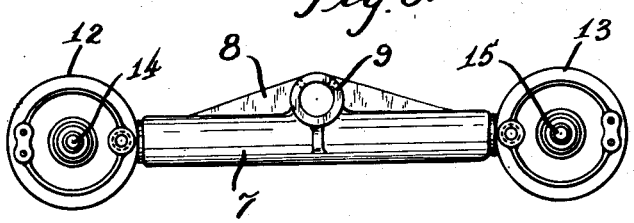
Figure 5 shows a side view of one of the walking beams shown in Figures 1 to 3, inclusive.

In operation, assume that the front pair of dual wheels W3, W4 is tilted in one direction and the rear pair of dual wheels W1, W2 is tilted in an opposite direction as illustrated by the latter mounting axle when in the position shown in Figure 4. It will be noted that under this condition the distance between housing members 10 and 10a must be increased to allow the lowermost wheels to ride depressions in the roadway such as the bottom of holes, etc.; likewise, the distance between housing members 11 and 11a must be increased in order to insure that the lowermost wheels will ride on depressions of the roadway surface. This increase in separation between the respective pairs of housing members is automatically taken care of by the longitudinal relative sliding movement between stub shaft 18 and its telescopically fitted sleeve 16 and by the longitudinal sliding movement of stub shaft 18a within sleeve 16a. In other words, the ends of sleeves 16 and 16a become more removed from housing members 10a and 11 and thereby effectively increase the lengths of both axle forming sleeves 16 and 16a when they are oppositely tilted as shown in Figure 4 insuring riding of all wheels on the roadway regardless of substantial irregularities of the roadway surface. Thus perfect alignment of the walking beams 7 and 7a is maintained and cross bracing of the walking beams and axles is secured so as to form a sturdy, substantially rectangular axle construction which enables the carrying of extremely heavy loads with substantially free, universal wheel movements to compensate for road irregularities.

Thus it will be seen that I have provided a novel tandem axle construction which is particularly useful for trailers, such as heavy duty low bed trailers, which tandem axle construction includes a substantially rectangular framework formed by walking beams and axle forming members extending at right angles thereto, which latter members are made of telescopically fitted parts to allow automatic adjustment of the length of the axle forming members to automatically compensate for tilting movements in transverse, vertical planes of the front and rear sets of wheels, thereby providing a very sturdy axle construction suitable for extremely heavy loads, maintaining alignment while at the same time always keeping contact between the wheels and roadway surface despite irregularities in the roadway surface.

While I have illustrated and described a certain specific embodiment of my invention, it will be understood that this is by way of illustration only, and that various changes and modifications may be made within the contemplation of my invention and within the scope of the following claims.

I claim:

1. A tandem axle construction for trailers comprising a pair of walking beams pivotally mounted substantially centrally thereof on axes extending transversely of the trailer to enable movement of said beams in vertical longitudinal planes, two pairs of members, each pair swivelly mounted on opposite end portions of said walking beams, wheel-carrying axle portions rigidly secured to said last mentioned members, and telescopically fitted elements integrally secured to said members for joining each pair of said members forming the front and rear axles, respectively, and for maintaining them at right angles to said walking beams at all times, there being relative longitudinal sliding movement in a transverse direction of said telescopically fitted parts for increasing the distance between the interconnected members as the wheel axle tilts in a transverse vertical plane to compensate for road irregularities by insuring riding of all wheels on an irregularly surfaced roadway at all times.

2. In a low bed trailer having a frame including a transversely extending frame member, two pairs of brackets secured underneath said transversely extending frame member and a pair of bearing members each extending through one of said pairs of brackets, and a pair of walking beams having transverse bores through which said bearing members extend so as to pivotally support said walking beams along transverse axes to enable movement of the beams in longitudinal, vertically extending planes, said walking beams having end stem portions, two pairs of substantially cruciform housing members rotatably mounted on the axes of said stem portions, wheel supporting spindles secured to said housing members, telescopically fitted elements for joining transversely opposite housing elements disposed along the same wheel axis, comprising a sleeve element shrunk fit and welded to a laterally extending portion of one of said housing members and adapted for relatively slidable longitudinal movement with a transversely extending portion of the other of said housing elements to enable variation of the length of the connection between the joined housing members in each of the front and rear axle assemblies so that when the front wheel axis formed by one of said sleeves is tilted in a transverse vertical plane in a direction opposite to that of the rear wheel axis in a parallel transverse vertically extending plane, the relative sliding movements of the telescopically fitted parts will automatically increase the distance between the joined pairs of housing members along both the front and rear wheel axes formed by said sleeves to compensate for road irregularities and to insure riding of all wheels on an irregularly surfaced roadway at all times.

3. A tandem axle construction for trailers comprising a pair of walking beams, means for pivotally mounting said beams substantially centrally thereof and for confining their movement to vertical longitudinal parallel planes with respect to the trailer, two pairs of wheel mounting members, each pair swivelly mounted on opposite end portions of said walking beams and restricted to swivel movement in transverse parallel planes, two pairs of telescopically fitted elements, each pair extending transversely between transversely aligned pairs of wheel mounting members and being integrally secured thereto and arranged to permit relative sliding movement in a transverse direction between the pairs of telescopically fitted elements so as to increase the distance between transversely disposed pairs of wheel mounting members as said walking beams tilt in opposite directions in longitudinal parallel planes to compensate for road irregularities.

LUTHER J. HUGHES.

REFERENCES CITED

The following references are of record in the file of this patent:

UNITED STATES PATENTS

| Number | Name | Date |
|---|---|---|
| 2,456,719 | Martin | Dec. 21, 1948 |
| 2,523,954 | Jungwirth | Sept. 26, 1950 |